United States Patent
Yin et al.

(10) Patent No.: US 11,290,021 B2
(45) Date of Patent: Mar. 29, 2022

(54) METHOD AND APPARATUS FOR GENERATING CONTROL SIGNAL AND CHARGING DC SUPPLY IN A SECONDARY SYNCHRONOUS RECTIFIER

(71) Applicant: Alpha and Omega Semiconductor (Cayman) Ltd., Grand Cayman (KY)

(72) Inventors: Jian Yin, San Ramon, CA (US); Qihong Huang, San Jose, CA (US)

(73) Assignee: ALPHA AND OMEGA SEMICONDUCTOR (CAYMAN) LTD., Grand Cayman (KY)

(*) Notice: Subject to any disclaimer, the term of this patent is extended or adjusted under 35 U.S.C. 154(b) by 22 days.

(21) Appl. No.: 16/777,745

(22) Filed: Jan. 30, 2020

(65) Prior Publication Data
US 2021/0242793 A1  Aug. 5, 2021

(51) Int. Cl.
*H02M 3/335*  (2006.01)
*H02M 1/00*  (2006.01)

(52) U.S. Cl.
CPC ..... *H02M 3/33592* (2013.01); *H02M 1/0006* (2021.05)

(58) Field of Classification Search
CPC .................................. H02M 3/33592
See application file for complete search history.

(56) References Cited

U.S. PATENT DOCUMENTS 7,666,534 B1 * 2/2010 Liu ........................... C01B 3/36
 429/425
7,688,602 B2  3/2010 Hu
(Continued)

FOREIGN PATENT DOCUMENTS

TW  M283432 U  12/2005
TW  202002492 A  1/2020

OTHER PUBLICATIONS

"AN103 The FET Constant Current Source/Limiter" Siliconix, Mar. 10, 1997.

(Continued)

*Primary Examiner* — Peter M Novak
(74) *Attorney, Agent, or Firm* — JDI Patent; Joshua Isenberg; Robert Pullman

(57) ABSTRACT

A multi-function switch has a Junction-Field Effect Transistor (JFET) that outputs a voltage for both charging and timing/sense the synchronous rectifier controller. Current is provided to a synchronous rectifier controller from a JET having its drain conductively coupled to the drain electrode of the secondary side rectifying MOSFET, wherein the current from the source of the JET is used for both timing/sense and powering the synchronous rectifier controller. The JFET is biased for a fixed output with its source to gate voltage at a turn on threshold voltage of the JFET for charging. The JFET is fully conducting from the secondary side of transformer with a small voltage drop across the drain to source electrode of the secondary side rectifying MOSFET for timing/sense. An input voltage is applied to timing and charging inputs of the synchronous rectifier controller, at low voltage across the drain to source electrode of the secondary side rectifying MOSFET or an input voltage is applied to a charging input through the first OR-ing MOSFET at high voltage across the drain to source electrode of the secondary side rectifying MOSFET.

20 Claims, 3 Drawing Sheets

(56) References Cited

U.S. PATENT DOCUMENTS

| | | | |
|---|---|---|---|
| 10,153,702 B2 | 12/2018 | Teo et al. | |
| 10,340,802 B1 | 7/2019 | Ke | |
| 2005/0127979 A1* | 6/2005 | Fan | H03K 17/76 |
| | | | 327/427 |
| 2015/0280573 A1* | 10/2015 | Gong | H02M 3/33507 |
| | | | 363/21.14 |
| 2019/0214898 A1* | 7/2019 | Iorio | H02M 3/3376 |
| 2021/0175790 A1* | 6/2021 | Ye | H02M 1/08 |

OTHER PUBLICATIONS

"Junction Field Effect Transistor (JFET)" Accessed Nov. 18, 2019.
Zhang et al. "A High-Efficiency Synchonous Rectifier Flyback for High-Density AC/DC Adapter: Application Report" Texas Instruments, Aug. 2011.
Office Action dated Oct. 6, 2021 for Taiwanese counterpart application No. 110102813.

* cited by examiner

METHOD AND APPARATUS FOR GENERATING CONTROL SIGNAL AND CHARGING DC SUPPLY IN A SECONDARY SYNCHRONOUS RECTIFIER

FIELD OF THE INVENTION

Aspects of the present disclosure generally relate to synchronous rectifiers and more particularly the present disclosure relates to timing and power of a secondary side synchronous rectifier in a power MOSFET.

BACKGROUND OF THE INVENTION

In a power converter reverse current through the secondary winding of a transformer is an issue. To prevent this many power converters use a diode biased against reverse current. An issue with the use of diodes to prevent reverse current is that diodes have a fixed voltage drop which is undesirable. Thus, many power converter designs use a secondary side MOSFET and synchronous rectifier instead of the diode. A MOSFET acts as resistance during conduction instead of a fixed voltage drop making it a better choice for power converters. The Synchronous rectifier controls the MOSFET to turn 'off' the MOSFET when a reverse current may be likely.

A problem with synchronous rectifiers in power converters is that they require a compatible power source and a timing signal. For timing signals, current implementations are complex and costly. One current solution is generating a timing signal at a primary side controller and then coupling the signal at the primary side to the secondary side through an opto-isolator, transformer or a class Y capacitor. Other current solutions generate the timing signal on the secondary side but, because the voltages of at the secondary side can be as high as 250 volts, the timing circuitry is required to be very robust, which is quite expensive. Similarly, for powering the synchronous rectifier only expensive solutions are available. Also, the synchronous rectifier cannot work without enough driving voltage; using the converter output as a power source is generally unfeasible because it could be lower than 5 volts. Some designs use an auxiliary winding on the transformer to supply the synchronous rectifier with DC power but this adds expense and bulk as a larger more complex transformer is required. Other designs use a secondary AC power source to charge the synchronous rectifier but this solution also requires that the synchronous rectifier be robust enough to withstand high voltages.

It is within this context that aspects of the present disclosure arise.

BRIEF DESCRIPTION OF THE DRAWINGS

Objects and advantages of aspects of the present disclosure will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
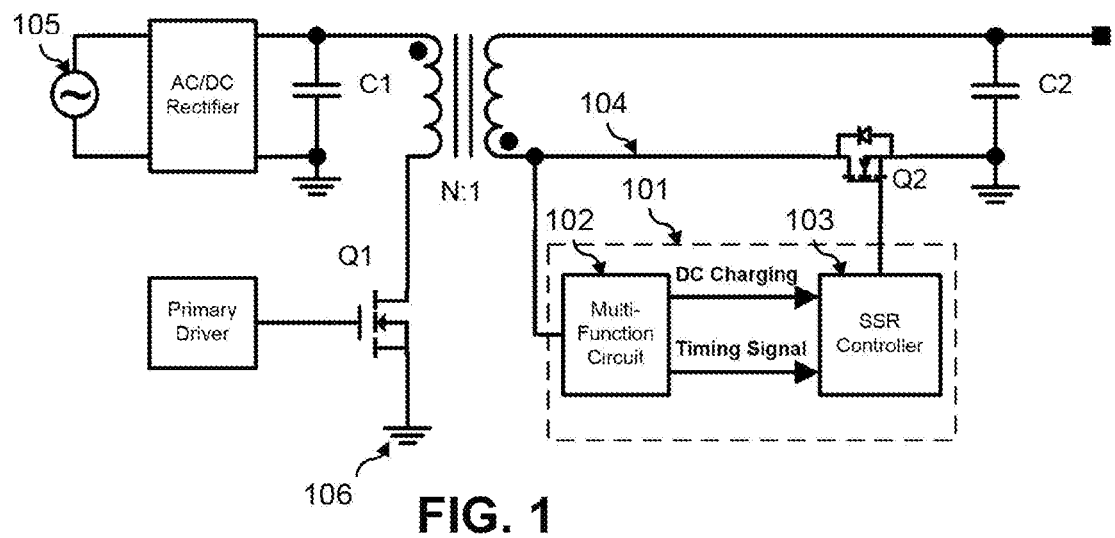
FIG. 1 is a schematic diagram of a power converter with an improved control signal generation and charging synchronous rectifier apparatus with according to an embodiment of the present disclosure

According to aspects of the present disclosure, a synchronous rectifier for use in a power converter may be improved through the addition an improved control signal and charging portion. As shown in FIG. 1 the improved charging and control signal synchronous rectifier apparatus 101 comprises at least a multifunction switch 102 and a synchronous rectifier controller 103.

In the embodiment shown in FIG. 1 the multi-function switch receives current from the low side line 104 of the secondary side of a power transformer having a turns ratio of N:1 by way of a conductive coupling. A conductive coupling may be any connection that allows the flow of electrical current from one element to the other. The current may flow directly between the two elements or through other additional intermediate elements through which the current flows. A conductive coupling may be, by way of example and not by way of limitation, a metal trace, a wire, a conductive carbon trace, a resistor, a spark gap or any other conductive element. The multifunction switch 102 provides the Synchronous rectifier controller 103 with both a timing/sense signal and a charging signal. The synchronous rectifier controller is powered by the charging signal and uses the timing/sense signal in control of the secondary side rectifying MOSFET Q2. To control the secondary side rectifying MOSFET Q2, the synchronous rectifier controller 103 is conductively coupled to the gate electrode of MOSFET Q2.

During operation as discussed above, the primary driver turns on the primary side switching MOSFET Q1 which allows current to flow from the AC voltage source through the AC/DC Rectifier where it is converted to DC voltage. The current flows through the primary side transformer N:1 to the MOSFET Q1 and ground 106. The flow of current across the primary winding of the transformer N:1 builds up a field in the transformer which causes current to flow through the secondary winding of the transformer N:1 when the MOSFET Q1 is turned "off". While Q is in the "on" state, the current through the secondary winding of the transformer is blocked by the secondary side rectifying MOSFET Q2 and it causes the low side line voltage to surge to high level due to the shutdown of MOSFET Q2. The Multifunction switch 101 functions to ensure that the voltage from the low side line 104 on the secondary side does not rise above the upper voltage tolerance limits of the synchronous rectifier controller 103. The multifunction switch 101 also detects the voltage rising and dropping of the low side line 104 thus providing an accurate timing signal for the synchronous rectifier controller 103. By way of example, the multifunction switch 102 may include a JFET (N channel), having its source coupled to both, a charging input and a timing/sense input of the synchronous rectifier controller 103.

Figure 2:
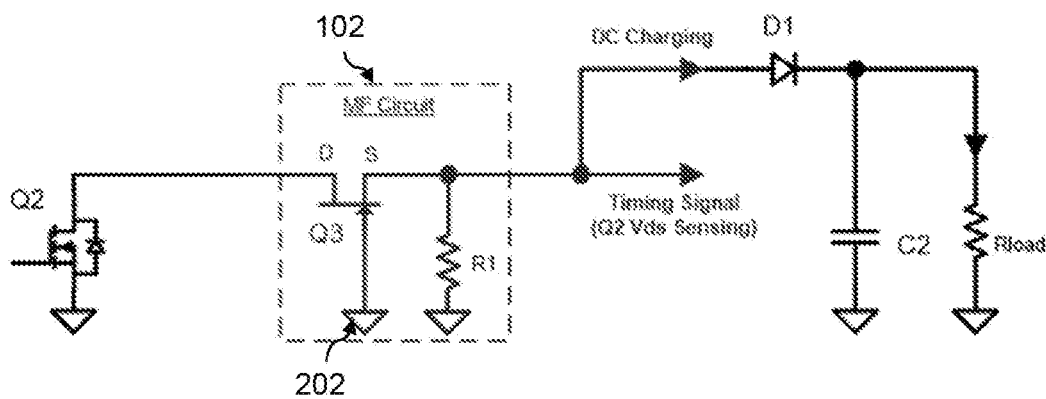
FIG. 2 is a cut-down schematic diagram of the improved control signals generation and charging portion of the apparatus according to an embodiment of the present disclosure

FIG. 2 is a cut down schematic diagram showing a possible implementation of the multi-function switch 102 in greater detail according to aspects of the present disclosure. In the illustrated example, a multifunction switch 102 includes a Junction Field Effect Transistor (JFET) Q3 and a resistor R1. The gate electrode of the JFET Q3 is conductively coupled to a ground plane 202, similarly one of the terminals of the resistor R1 is conductively coupled to the ground plane. According to aspects of the present disclosure the multifunction switch 102 or the apparatus have its own separate ground plane. Alternatively, the apparatus comprising the multifunction switch 102 and synchronous rectifier controller 103 may have its own separate ground plane. Thus, the resistor R1 is in series with the JFET Q3. During operation, the JFET acts as a voltage limiter, which allows the voltage at the source terminal of the JFET to rise up to the gate turn-on threshold voltage $V_{th}$ of the JET Q3. As the voltage across the resistor R1 also increases, the voltage across source to gate electrode of the JFET Q3 rises close to the turn-on gate threshold voltage and remains at the threshold voltage, so as to have the JFET Drain to Source carry the additional voltages from the drain terminal of Q2, if greater than the gate threshold voltage. Thus according to aspects of the present disclosure $V_{th}$ of the JFET Q3 and the resistance of the resistor R1 are selected such that the JFET is turned on thus carrying the high voltage when the voltage at the drain of the JET is higher than an upper voltage tolerance of the synchronous rectifier controller. Additionally, the JFET may be chosen to have a quick response to changes in the voltage thus allowing for accurate timing of the synchronous rectifier controller as the voltage on drain of JFET rises or drops quickly. Additionally, as the voltage on the drain of the JFET drops to a low level after MOSFET Q1 is turned off, the WET Q3 begins fully conducting. Small voltage drops from MOSFET Q2 that can act as a control signal for the synchronous rectifier controller. The drain voltage of MOSFET Q2 can therefore pass through WET Q3 and be detected by SSR controller for current sensing of MOSFET Q2.

According to some embodiments of the present disclosure the upper voltage tolerance of the synchronous rectifier controller may be less than 50 volts more preferably 40 volts and still more preferably 30 volts or less but still above 2 to 3 volts. A floor voltage may be the minimum voltage required to run the synchronous rectifier controller. For example and without limitation the floor voltage may be 3.3 volts, 3 volts, below 3 volts, or 2 volts. According to some additional alternative embodiments, a voltage limit may be used. The voltage limit may be the upper voltage tolerance of the synchronous rectifier controller or another working voltage chosen below the upper voltage tolerance of the synchronous rectifier controller. A high voltage may be any voltage greater than the upper voltage tolerance of the synchronous rectifier controller and a low voltage may be any voltage below the upper voltage tolerance of the synchronous rectifier controller.

Figure 3:
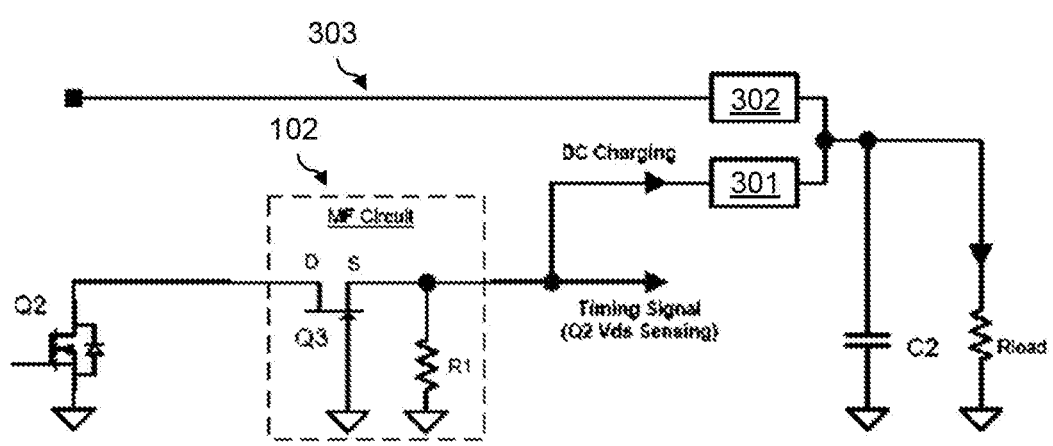
FIG. 3 is a cut-down schematic diagram of the improved control signal generation and charging portion of the synchronous rectifier apparatus with optional charging from converter output or regular through Q3 according to aspects of the present disclosure.

FIG. 3 depicts an alternative embodiment of the improved control signal generation and charging portion of the synchronous rectifier apparatus with optional high side (converter output) and low side charging according to aspects of the present disclosure. As shown the diode D1 in FIG. 2 has been replaced with a first OR-ing MOSFET 301 and a second OR-ing MOSFET 302 OR-ing MOSFET. A first OR-ing MOSFET 301 may be conductively coupled to the source electrode of the multifunction switch 102. The second OR-ing MOSFET 302 may receive current from the output 303 of the converter. The outputs of the first OR-ing MOSFET 301 and second OR-ing MOSFET 302 may be conductively coupled to the charging input of the synchronous rectifier controller 103 and to a capacitor C2.

During operation when the voltage from the output 303 of the converter in the secondary side is below the voltage tolerance of the synchronous rectifier controller and is above a floor voltage to run the synchronous rectifier controller, the second OR-ing MOSFET 302 may be turned "on" and the first OR-ing MOSFET 301 may be turned "of" by the SSR controller 103. The synchronous rectifier controller may be run and the capacitor C2 may be charged from current from the converter output through the second OR-ing MOSFET. In this case, the voltage from the multifunction switch 201 is used for voltage sensing at the synchronous rectifier controller. When Voltage from the secondary side output 303 is not available, higher than the tolerance or lower than the floor the first OR-ing MOSFET 301 is turned ' on' and the second OR-ing MOSFET 302 is turned 'off.' The synchronous rectifier controller is subsequently run and the capacitor C2 is charged from current through the multifunction switch 201 and the first OR-ing MOSFET 301. Additionally the timing signal is provided by voltage from the multifunction switch when the first OR-ing MOSFET is in the 'on' state. The Or-ing MOSFET 302 may be controlled by via a signal generated by the synchronous rectifier controller 103.

Figure 4:
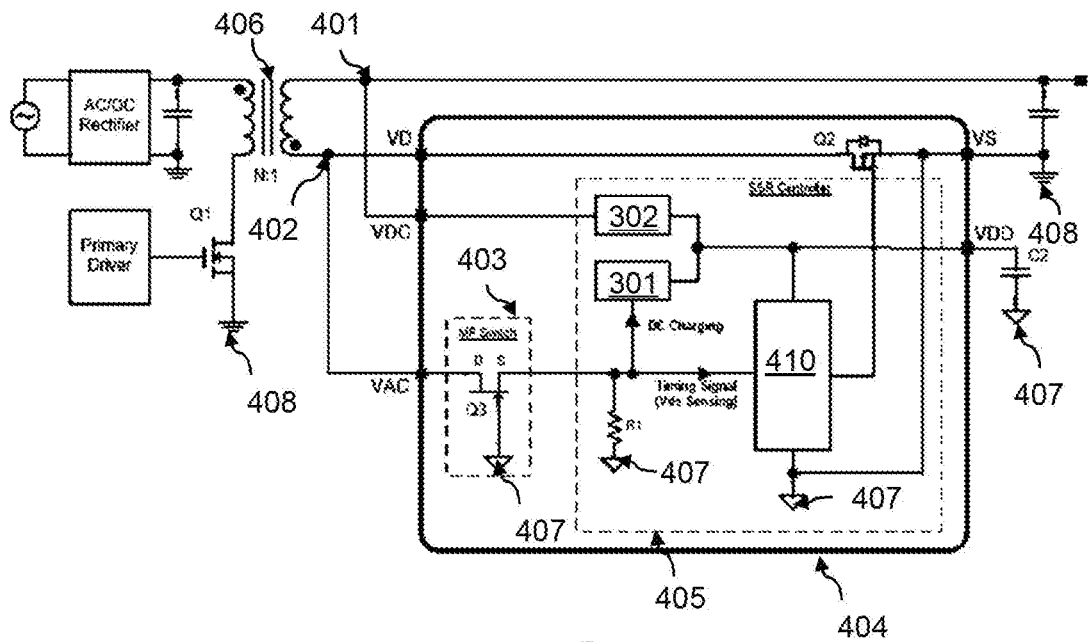
FIG. 4 is a detailed schematic diagram of a power converter with the improved control signal and charging synchronous rectifier apparatus having synchronous rectifier on the low side of secondary winding, with both high side and low side of the secondary winding charging and low side sensing control signal according to aspects of the present disclosure.

FIG. 4 depicts power converter with the improved control signal and charging synchronous rectifier apparatus 404 having a secondary high side line 401 providing converter output and a secondary low side line 402 connecting to the secondary side rectifying MOSFET Q2 according to aspects of the present disclosure. Additionally as shown the apparatus 404 comprises a multifunction switch device 403 and the synchronous rectifier module 405. In the embodiment shown the resistor R1 has been moved from the multifunction switch 102 to the Synchronous rectifier module 405 according to aspects of the present disclosure. The multifunction switch device 403 shown comprises an N-channel JFET. In the embodiment shown the multifunction switch device 403 receives voltage from the low side line 402 of the secondary side of the transformer 406. Here, the voltage from the low side line 402 is used as timing and sensing signal for the synchronous rectifier controller 410. This means that the timing signal is coming directly from the secondary side of the transformer through the multi-function switch device 403. As discussed above, the multi-function switch is chosen such that its gate threshold voltage, $V_{th}$, and the resistance of resistor R1 are chosen such that the gate of the JFET Q3 remains 'on' at Vth, when the voltage at source S of the JFET Q3 reaches at or below a voltage tolerance of the synchronous rectifier controller 410. The apparatus shown is also conductively coupled to the high side line 401 and may use the voltage received from the high side line 401 to power the synchronous rectifier controller 410 through a FET or diode 302 and charge the capacitor C2. During operation the timing/control signal is used by the synchronous rectifier controller 410 to control the rectifying MOS- FET Q2. As shown in FIG. 4, the rectifying MOSFET Q2 drain lead VD is connected to the low side line 402 of the secondary side of the transformer 406 and the rectifying MOSFET Q2 source lead VS is connected with the secondary side ground plane 408 of the power converter. Control of the rectifying MOSFET Q2 ensures that no reverse current flows through secondary winding of the transformer 406 while a charge is being built up in the transformer.

Figure 5:
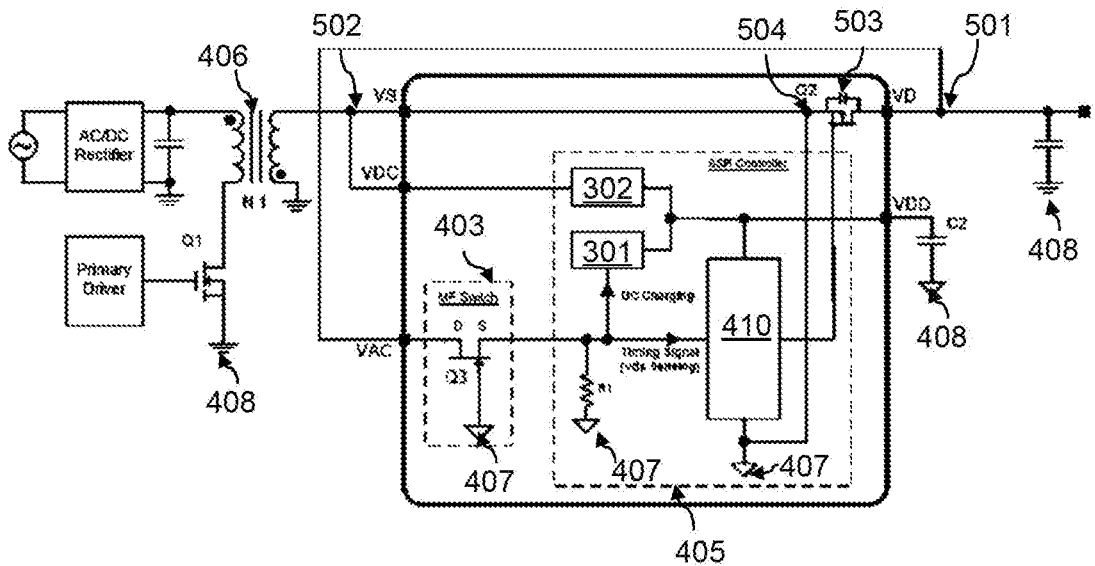
FIG. 5 is a detailed schematic diagram of a power converter with the improved control signal and charging apparatus having synchronous rectifier on the high side of secondary winding, with converter output as both charging source and control signal sense according to aspects of the present disclosure.

FIG. 5 is a schematic diagram of a power converter with the improved control signal and charging apparatus having a high side line 502 coupling through the secondary side rectifying MOSFET Q2 to provide the converter output 501 according to aspects of the present disclosure. In the embodiment shown the multifunction switch device 403 receives voltage through a conductive coupling to the converter's output 501. In this apparatus, the second OR-ing MOSFET 302 is disabled through a conductive coupling to high side line 502 of the secondary side of the transformer 406, at the same point of the Source of MOSFET Q2. Here, the voltage from the drain of MOSFET Q2 or the converter output 501 is used as timing and sensing signal for the synchronous rectifier controller 410. This means that the timing signal is coming directly from the converter' output through the multi-function switch device 403. Also, As discussed above, the multi-function switch device 403 supplies the power to the synchronous rectifier controller 410 through the OR-ing MOSFET 301.

Additionally in some embodiments with discrete rectifying MOSFETS Q2, to perform high side rectification the rectifying MOSFET Q2 in FIG. 5 is installed backwards in comparison to FIG. 4. This insures that the body diode of the rectifying MOSFET Q2 is biased against the reverse flow of current at the high side. In alternative embodiments, the rectifying MOSFET Q2 may be integrated or co-packaged into a package with the SSR controller module 405, the multifunction switch device 403 or both. In these embodiments the high side implementation as shown in FIG. 5 may simply be accomplished by coupling the integrated package in reverse orientation of the package shown in FIG. 4. In other words, the rectifying MOSFET Q2 source lead VS is connected to the high side line 502 of the secondary side of the transformer 406 and the rectifying MOSFET Q2 drain lead VD is connected with the converter's output 501 in the path of the current flow.

In some embodiments according to aspects of the present disclosure, the apparatus may additionally comprise the rectifying MOSFET Q2 and the capacitor C2. Alternatively, the Apparatus may comprise a discrete JFET Q3, discrete MOSFETS 301 and 302, discrete resistor R1, discrete synchronous rectifier controller 410, discrete rectifying MOSFET Q2 and discrete capacitor C2. Additionally in some embodiments, the apparatus may have a ground plane coupling 407 that is separate from the ground plane of the power converter 408.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An apparatus, comprising:
a synchronous rectifier controller;
a multi-function switch conductively coupled to the synchronous rectifier controller, wherein the multi-function switch comprises a Junction-Field Effect Transistor (JFET) having a source conductively coupled to a charging input and conductively coupled to a timing/control input of the synchronous rectifier controller.

2. The apparatus of claim 1 further comprising a secondary side rectifying Metal Oxide Field Effect Transistor (MOSFET) coupled to the synchronous rectifier controller wherein the gate electrode of the secondary side rectifying MOSFET is conductively coupled to the synchronous rectifier controller.

3. The apparatus of claim 2 wherein there is less than 1 second delay between a change in the voltage from secondary side of a transformer coupled the JFET and a change in the voltage output of the an JFET.

4. The apparatus of claim 2 further comprising a power transformer, wherein the multifunction switch is conductively coupled to a secondary side of the power transformer or the drain electrode of the secondary side rectifying MOSFET.

5. The apparatus of claim 4, further comprising a primary side MOSFET wherein a primary side of the power transformer is conductively coupled to the primary side MOSFET and wherein the primary side MOSFET and the primary side of the transformer are configured such that current flowing through the primary side MOSFET and primary side of the power transformer causes current to flow through the secondary side of the power transformer when the primary side MOSFET is turned "off".

6. The apparatus of claim 1 further comprising a resistor conductively coupled to the JFET, wherein the JFET is an N-channel JFET and wherein a gate electrode of the N-channel JFET and a terminal of the resistor are conductively coupled to the same ground plane or shorted together directly separate from a ground of a power converter.

7. The apparatus of claim 1 further comprising a first OR-ing MOSFET conductively coupled to the DEFT and to a charging input of the synchronous rectifier controller wherein the first OR-ing MOSFET is configured to turn "on" when a voltage from a high side line of a transformer secondary winding or converter output is insufficient to charge the synchronous rectifier controller.

8. The apparatus of claim 7 further comprising a second OR-ing MOSFET conductively coupled to the charging input of the synchronous rectifier controller and a high side line of the secondary side of the transformer or a power converter output wherein the second OR-ing MOSFET is configured to turn "on" and the first OR-ing MOSFET is configured to turn 'off' when the voltage from the high side of the power transformer secondary winding or the power converter output is sufficient to charge the synchronous rectifier controller.

9. The apparatus of claim 1 further comprising a diode conductively coupled to the multifunction switch and a charging input of the synchronous rectifier controller.

10. The apparatus of claim 1 wherein the JFET is conductively coupled to the drain electrode of a secondary side rectifying MOSFET wherein the JFET is configured to carry additional voltage more than a voltage limit when a voltage from the secondary side of the transformer exceeds the voltage limit and wherein the JFET conducts current if a first OR-ing MOSFET is on.

11. The apparatus of claim 10 wherein the voltage limit is a voltage tolerance of the synchronous rectifier controller or the voltage limit is at or below 100 volts.

12. A method for supplying secondary side control signal and charging input in a power converter, comprising:
provifing current to a synchronous rectifier controller from a JFET having a drain conductively coupled to the drain electrode of the secondary side rectifying MOSFET, wherein the source of the JFET is coupled to a timing/sense input and a charging input of the synchronous rectifier controller;
biasing the JFET for a fixed output with its source to gate voltage at a turn-on threshold of the JFET for charging, wherein the JFET fully conducts for timing/sense at low voltage across the drain to source electrode of the secondary side rectifying MOSFET;
applying an input voltage to the timing input and the sense input to synchronous rectifier controller through the JFET at low voltage across the drain to source electrode of the secondary side rectifying MOSFET; and
applying an input voltage at the charging input through the JFET to a first OR-ing MOSFET at high voltage across the drain to source electrode of the secondary side rectifying MOSFET.

13. The method of claim 12 wherein the synchronous rectifier controller provides a control signal to a rectifying MOSFET wherein the control signal is configured to prevent reverse current from traveling through the secondary side of a power transformer during a charging cycle.

14. The method of claim 12 wherein the JFET is conductively coupled to a low side line of the secondary side of a power transformer or the drain electrode of the secondary side rectifying MOSFET.

15. The method of claim 12 wherein the current powering the synchronous rectifier controller is provided through a first OR-ing MOSFET and wherein the first OR-ing MOSFET is turned off when there is a voltage at or below an upper voltage tolerance and at or higher than a minimum operating voltage of the synchronous rectifier controller at a second OR-ing MOSFET.

16. The method of claim 15 further comprising turning on the second OR-ing MOSFET when a voltage at or below the upper voltage tolerance and at or higher than a minimum operating voltage of synchronous rectifier controller is received from a secondary side of a power transformer and providing current to the synchronous rectifier controller and a capacitor through the second OR-ing MOSFET when the OR-ing second MOSFET is in the "on" state.

17. The method of claim 16 wherein the voltage at the second OR-ing MOSFET is received from the high side line of the secondary side of the transformer or converter output and wherein the second OR-ing MOSFET is conductively coupled to the high side line of the secondary side of the transformer or converter output.

18. The method of claim 12 further comprising receiving current at the JFET from a low side line of the secondary side of the transformer and wherein the JFET is conductively coupled to the low side line of the secondary side of the transformer.

19. The method of claim 12 further comprising receiving current at the JFET from a drain electrode of the secondary side rectifying MOSFET and wherein the JFET is conductively coupled to the drain electrode of the secondary side rectifying MOSFET.

20. The method of claim 12 wherein the JFET is an N-channel JFET.

* * * * *